United States Patent [19]
Harris et al.

[11] Patent Number: 6,097,532
[45] Date of Patent: Aug. 1, 2000

[54] METHOD FOR PRODUCING ELECTROMAGNETICALLY INDUCED TRANSPARENCY IN ATOMS WITH HYPERFINE STRUCTURE

[75] Inventors: Stephen E. Harris; Andrew J. Merriam, both of Palo Alto; Scott J. Sharpe; Hui Xia, both of Stanford; Guang-Yu Yin, Mountain View, all of Calif.

[73] Assignee: The Board of Trustees of the Leland Stanford Junior University, Palo Alto, Calif.

[21] Appl. No.: 09/183,712

[22] Filed: Oct. 30, 1998

[51] Int. Cl.[7] .................................................. G02F 1/39
[52] U.S. Cl. ............................................ 359/326; 359/330
[58] Field of Search .................................. 359/326–332; 372/3–5

[56] References Cited

U.S. PATENT DOCUMENTS 5,771,117   6/1998   Harris et al. .............................. 359/326
5,970,039   10/1999  Ichimura et al. ......................... 369/116

OTHER PUBLICATIONS

H. Xia et al, "Electromagnetically Induced Transparency With Spectator Momenta", 1998 Quantum Electronics Conference (IQEC98) Technical Digest, Paper QWG1, May 1998, pp. 129–130.

*Primary Examiner*—John D. Lee
*Attorney, Agent, or Firm*—Lumen Intellectual Property Services

[57] ABSTRACT

A method for producing electromagnetically induced transparency (EIT) in atoms with hyperfine structure. EIT is the phenomenon in which a material (e.g. lead vapor) becomes transparent to a first electromagnetic frequency (a probe beam) when exposed to a second electromagnetic frequency (a coupling beam). In the present invention, the atom has hyperfine split energy levels. In the method of the present invention, the coupling and probe beams are tuned to transitions between the centers of gravity (COGs) of the hyperfine split levels. This allows high transparencies to be achieved in high opacity materials. Also, the present method can produce EIT in isotopically mixed materials. This is because the COGs of hyperfine split levels (in nuclear spin 0 atoms) are generally coincident with nonhyperfine split levels (in nuclear spin=0 atoms). The method of the present invention is directly applicable to nonlinear sum and difference frequency generation.

42 Claims, 6 Drawing Sheets

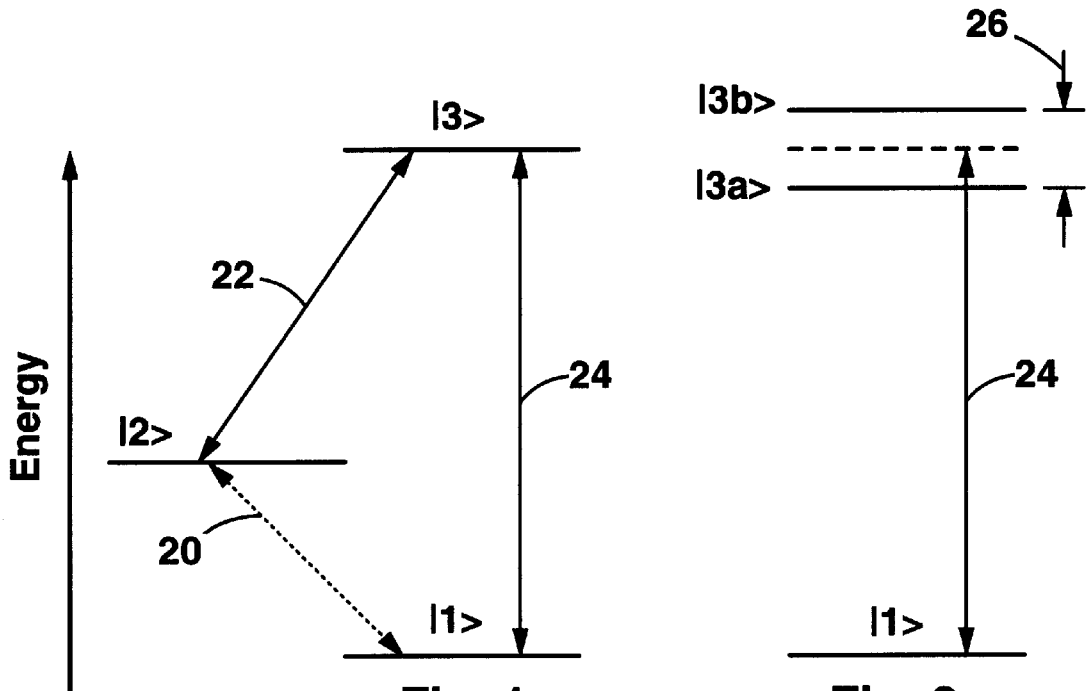
Fig. 1 Prior Art
Fig. 2 Prior Art
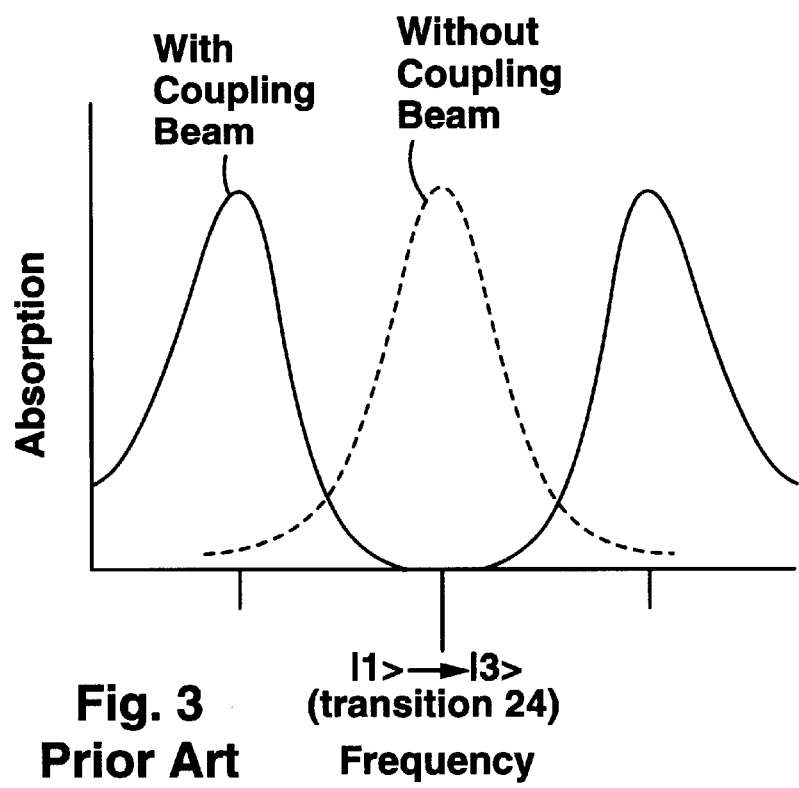
Fig. 3 Prior Art

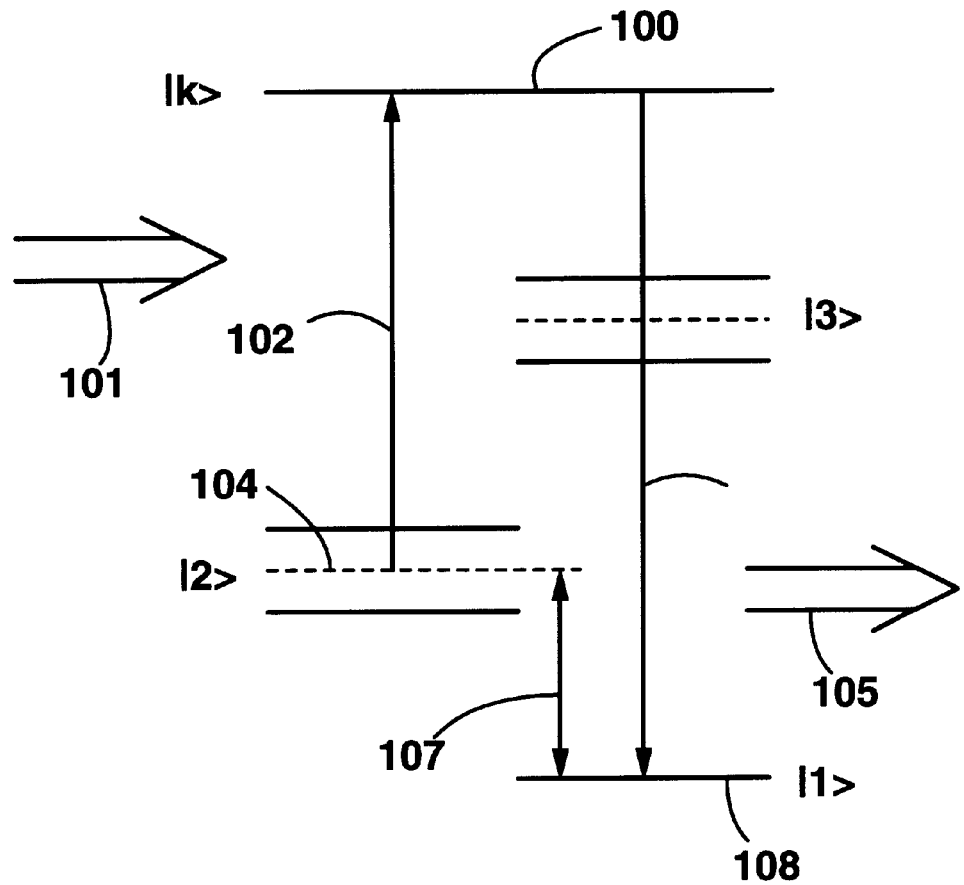
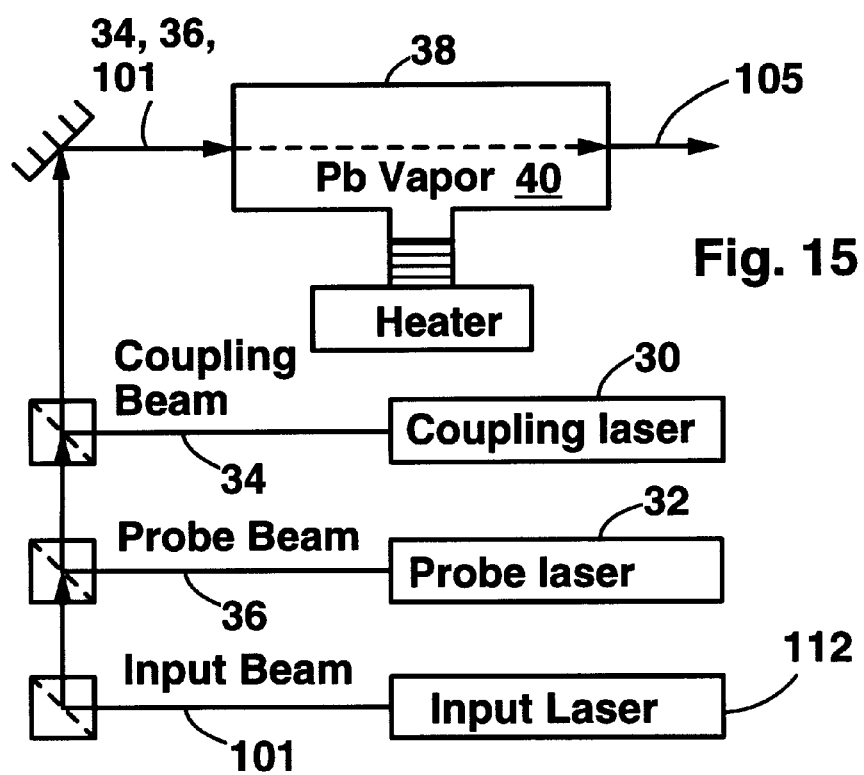
Fig. 15

METHOD FOR PRODUCING ELECTROMAGNETICALLY INDUCED TRANSPARENCY IN ATOMS WITH HYPERFINE STRUCTURE

FIELD OF THE INVENTION

This invention relates generally to atomic physics and nonlinear optics. More particularly, this invention relates to a method of performing electromagnetically induced transparency (EIT) in atoms that have a nonzero nuclear spin. EIT has many applications known in the art, including nonlinear optical frequency generators, inversionless lasers, optical parametric oscillators, high-sensitivity magnetometers, and other research applications. All of these applications may benefit from the improved technique of the present invention.

BACKGROUND OF THE INVENTION

Electromagnetically induced transparency (EIT) is a phenomenon that is now well known in the art. EIT employs a medium (e.g. strontium vapor or lead vapor) that has an absorbing atomic transition. The medium strongly absorbs light resonant with the atomic transition. In other words, the medium is opaque to a light beam resonant with the atomic transition. In the method of EIT, light of a second frequency (a coupling beam), prevents the medium from absorbing light of the resonant frequency (a probe beam). In addition, it prevents the medium from imparting an excess phase shift to the probe beam. The medium is thereby rendered transparent to the probe beam. Light of the coupling beam induces the medium to become transparent to light of the probe beam.

FIG. 1 shows an energy level diagram of an atom capable of experiencing EIT. Level |1> may be a ground level for the atom, (as is the case of $^{208}$Pb vapor). Transition 20 between level |1> and level |2> is a dipole forbidden transition. Electrons in level |2> cannot decay to level |1> via an electric dipole transition. Instead, electrons in level |2> decay to level |1> via much slower quadrupole and two-photon transitions. Level |2> is known as a metastable level. Transitions 22, 24, are dipole allowed between levels |2> and |3>, and between levels |1> and |3>. These transitions 22, 24 can be induced by an external dipole electric field.

In EIT, the coupling beam is resonant with transition 22, and the probe beam is resonant with transition 24. Application of the coupling beam causes transition 24 to be unable to absorb the probe beam. FIG. 2 illustrates why this is so. FIG. 2 shows the energy level diagram of a dressed atom; the energy levels have been modified by the application of the coupling beam. The coupling beam mixes levels |2> and |3> to produce new levels |3a> and |3b>. Levels |3a> and |3b> are equally separated from the original position of level |3>, and are separated from each other by a spitting energy 26. The splitting energy 26 is equal to a Rabi frequency, Ω, of the coupling laser, which is defined as follows:

$$\Omega = \frac{2\pi \mu_{23} E}{h}$$

Where $\mu_{23}$ is the dipole matrix element or coupling coefficient (a fundamental property of the atomic species), E is the electric field of the coupling beam, and h is Planck's constant.

Therefore, the Rabi frequency and the splitting energy 26, are controllable by adjusting the intensity of the coupling beam:

$$\Omega \propto \sqrt{I}$$

Where I is the intensity of the coupling beam. In the dressed atom, transition |1> to |3a> and transition |1> to |3b> are absorbing and separated in energy by the Rabi frequency. However, when the probe beam is tuned into resonance with transition 24 (|1> to midway between states |3a> and |3b>), zero absorption occurs. Due to the proximity of levels |3a> and |3b> to level |3>, one would expect some absorption of the probe beam by levels |3a> and |3b>. This does not happen, however, because levels |3a> and |3b> exhibit a destructive quantum interference in the absorption profile. This destructive quantum interference prevents any electron from decaying from levels |3a> and |3b> to any other level in the atom. Therefore, when the medium is exposed to the coupling beam, and the probe beam is tuned to transition 24, the atoms cannot absorb energy from the probe beam, and the probe beam passes through the medium relatively unaffected. FIG. 3 is a graph illustrating the absorption spectrum of the medium with the coupling beam and without the coupling beam.

If the probe beam is not applied, then level |2> is empty. Application of the coupling and probe beam results in level |2> becoming populated. Atoms with both level |2> and level |1> populated may behave as local oscillators, capable of mixing with optical frequencies to produce sum and difference frequencies (similar to the practice of signal mixing in the radiofrequency arts). This effect provides the basis for many nonlinear optical effects, including nonlinear frequency generation. Reference can be made to U.S. Pat. No. 5,771,117 to Harris et al. concerning this application of EIT.

Previous applications of EIT have often relied upon the use of isotopically pure materials, which are very expensive. As a specific example, it is known in the art that $^{208}$Pb can be used in EIT applications. $^{208}$Pb, however, costs about $5,000 per gram, and several grams are often necessary to produce a useful EIT nonlinear optical device. The reason that isotopically pure materials are necessary is that different isotopes have different energy level structures. Therefore, in isotopically mixed materials, the coupling and probe beams cannot be tuned to be resonant with all the atoms. Atoms slightly off resonance with the coupling beam will absorb the probe beam, thereby preventing complete transparency, and impart additional phase on the probe beam.

Different isotopic species often have different energy levels due to the phenomenon of hyperfine splitting. Hyperfine splitting occurs when the nucleus of an atom has nonzero nuclear spin and hence a nonzero magnetic moment. The magnetic moment of the nucleus causes some electron energy levels (i.e. energy levels with nonzero total angular momentum, J 0) to split into two (for nuclear spin=½) or more closely spaced levels. This hyperfine splitting is small but confounds attempts to tune the coupling beam and probe beam to a single energy level.

In the prior art, atoms with closely spaced hyperfine split energy levels have been used in EIT by tuning the coupling and probe beams to discrete transitions between the hyperfine levels. However, this approach requires the use of low opacity (and hence low density) samples. This is unfortunate because, for many applications such as nonlinear frequency generation, it is preferable to have high opacity, high density samples. This is because high opacity and high density samples provide higher power capability, and higher frequency conversion efficiencies.

Current techniques for demonstrating EIT in atoms with hyperine structure cannot be extended to high opacities.

It would be an advance in the art of EIT, and particularly in the art of nonlinear frequency generation (a particularly useful application of EIT) to be able to perform EIT with atoms that have hyperfine split energy levels. The ability to perform EIT with materials that have hyperfine split energy levels would greatly increase the number of atomic species that can be used with EIT.

It would be a further advance in the art of EIT to be able to perform EIT with isotopically mixed materials. The ability to perform EIT with isotopically mixed materials would reduce the cost of devices which exploit the phenomenon of EIT.

Further, it would be an advance in the art to be able to perform EIT with high opacity and high density samples that have hyperfine split energy levels.

OBJECTS AND ADVANTAGES OF THE INVENTION

Accordingly, it is a primary object of the present invention to provide a method of performing EIT that:

1) is usable with materials that have hyperfine split energy levels;
2) is usable with isotopically mixed materials; and
3) is capable of providing high power EIT in high opacity materials.

These and other objects and advantages will be apparent upon reading the following description and accompanying drawings.

SUMMARY OF THE INVENTION

These objects and advantages are attained by first selecting an atomic species which has electronic levels $|1>$, $|2>$, and $|3>$ that satisfy the requirements of EIT. More specifically, level $|1>$ has the lowest energy of levels $|1>$, $|2>$ and $|3>$; a transition between level $|2>$ and level $|1>$ is dipole forbidden; a transition between level $|1>$ and level $|3>$ is dipole allowed; and a transition between level $|2>$ and level $|3>$ is dipole allowed. Also, at least one of the levels $|1>$, $|2>$, and $|3>$ is hyperfine split. Each of the levels $|1>$, $|2>$, and $|3>$ has a center of gravity (COG). Once such an atomic species is selected, a coupling beam is applied to the atom. The coupling beam is tuned so that it is resonant with a transition extending between the center of gravity of level $|2>$ and the center of gravity of level $|3>$. Then, a probe beam is applied. The probe beam is tuned so that it is resonant with a transition extending between the center of gravity of level $|1>$ and the center of gravity of level $|3>$.

Necessarily, the coupling beam has a Rabi frequency that is greater than the larger of the hyperfine splitting energy of level $|2>$ and the hyperfine splitting energy of level $|3>$. More preferably, the coupling beam has a Rabi frequency that is 5 times as large as the larger of the hyperfine splitting energy of level $|2>$ and the hyperfine splitting energy of level $|3>$.

The method of the invention may also include the step of applying an input beam to the atom so that nonlinear frequency conversion is achieved. In this case, the atom has a level $|k>$ which is known in the art. Level $|k>$ can be an electroic level of the atom, or a virtual level. The input beam is tuned to a transition between the center of gravity of level $|2>$ and level $|k>$, thereby producing a generated beam having a frequency different from the input beam.

The atom may be a $^{207}$Pb atom. Also, level $|3>$ may be hyperfine split.

The present invention also includes a method for producing EIT in an isotopically mixed material. The material includes a first isotope with zero nuclear spin, and a second isotope with nonzero nuclear spin. The first isotope has hyperfine unsplit levels $|1>$, $|2>$, and $|3>$ which satisfy the requirements of EIT. The second isotope has levels $|4>$, $|5>$, and $|6>$ which also satisfy the requirements of EIT. At least one of the levels $|4>$, $|5>$, and $|6>$ is hyperfine split. Also, levels $|4>$, $|5>$, and $|6>$ each have a center of gravity (COG). The COGs of $|4>$, $|5>$, and $|6>$ are coincident with levels $|1>$, $|2>$, and $|3>$. A coupling beam is applied to the material. The coupling beam is resonant with a transition from $|2>$ to $|3>$ in the first isotope. The coupling beam is also resonant with a transition from the COG of $|5>$ to the COG of $|6>$. A probe beam is applied to the material. The probe beam is resonant with a transition from $|1>$ to $|3>$ in the first isotope. The probe beam is also resonant with a transition from the COG of $|4>$ to the COG of $|6>$. Preferably, the Rabi frequency of the coupling beam exceeds the hyperfine splittings of the larger of levels $|5>$ and $|6>$. More preferably, the Rabi frequency is 5 or 8 times larger than the hyperfine splittings of levels $|5>$ and $|6>$.

The first and/or second isotope may have a level $|k>$ so that nonlinear frequency generation is possible by applying an input beam resonant to a transition between $|2>$ and $|k>$, or between COG of $|5>$ and $|k>$. In a specific embodiment, the first isotope is either $^{208}$Pb or $^{206}$Pb and the second isotope is $^{207}$Pb.

In another embodiment of the present invention, EIT is produced in a material having two isotopes, both with nonzero nuclear spin. In this method, a first isotope is selected that has levels $|1>$, $|2>$, and $|3>$ which satisfy the requirements of EIT. At least one of levels $|1>$, $|2>$, and $|3>$ is hyperfine split. A second isotope is then selected that has levels $|4>$, $|5>$, and $|6>$ which satisfy the requirements of EIT. At least one of levels $|4>$, $|5>$, and $|6>$ is hyperfine split. Levels $|1>-|6>$ each have a center of gravity. The COGs of levels $|1>$, $|2>$, and $|3>$ are coincident with the COGs of levels $|4>$, $|5>$, and $|6>$, respectively. Next a coupling beam is applied to the material. The coupling beam is resonant with a transition from COG of $|2>$ to COG of $|3>$ in the first isotope. The coupling beam is also resonant with a transition from the COG of $|5>$ to the COG of $|6>$. A probe beam is then applied to the material. The probe beam is resonant with a transition from COG of $|1>$ to COG of $|3>$ in the first isotope. The probe beam is also resonant with a transition from the COG of $|4>$ to the COG of $|6>$.

Preferably, a Rabi frequency of the coupling beam is greater than the larger of the hyperfine splitting energy of level $|2>$; the hyperfine splitting energy of level $|3>$; the hyperfine splitting energy of level $|5>$; and the hyperfine splitting energy of level $|6>$. More preferably, the Rabi frequency is 5 or 8 times larger than any of these hyperfine splittings.

The first and/or second isotope may have a level $|k>$ so that nonlinear frequency generation is possible by applying an input beam resonant to a transition between $|2>$ and $|k>$, or between COG of $|5>$ and $|k>$.

The present invention also includes an apparatus for providing EIT. The apparatus includes a material having atoms with electronic levels $|1>$, $|2>$, and $|3>$ that satisfy the requirements of EIT. At least one of levels $|1>$, $|2>$, and $|3>$ is hyperfine split and all three levels have a center of gravity. The apparatus further includes a coupling laser directed toward the material. The coupling laser is tuned to resonate with a transition extending between the center of gravity of level $|2>$ and a center of gravity of level $|3>$. The apparatus also has a probe laser which is directed toward the material. The probe laser is tuned to resonate with a transition extending between the center of gravity of level $|1>$ and a center of gravity of level $|3>$.

The material can comprise $^{207}$Pb atoms.

DESCRIPTION OF THE FIGURES

FIGS. 1–2 (PRIOR ART) shows energy level diagrams for an atom in which electromagnetically induced transparency (EIT) is produced.

FIG. 3 (PRIOR ART) shows a graph which illustrates the effect of EIT on the transmission spectrum.

FIG. 14 shows an energy level structure which illustrates a method of nonlinear frequency conversion according to the present invention.

FIG. 15 shows an apparatus capable of performing the method of FIG. 14.

DETAILED DESCRIPTION

In the present application, it is understood that the term "level" may indicate a single nondegenerate quantum mechanical electronic state, or a degenerate level comprising a group of states all having the same energy. Further, it is understood that "level" may also refer to the manifold of levels which are produced from an original level by hyperfine splitting. In this way, a hyperfine split level is considered to have a center of gravity. For example, in FIG. 6, when in the context of the hyperine split atom level |2> refers to the manifold consisting of levels |2++> and |2–>.

Figure 4:
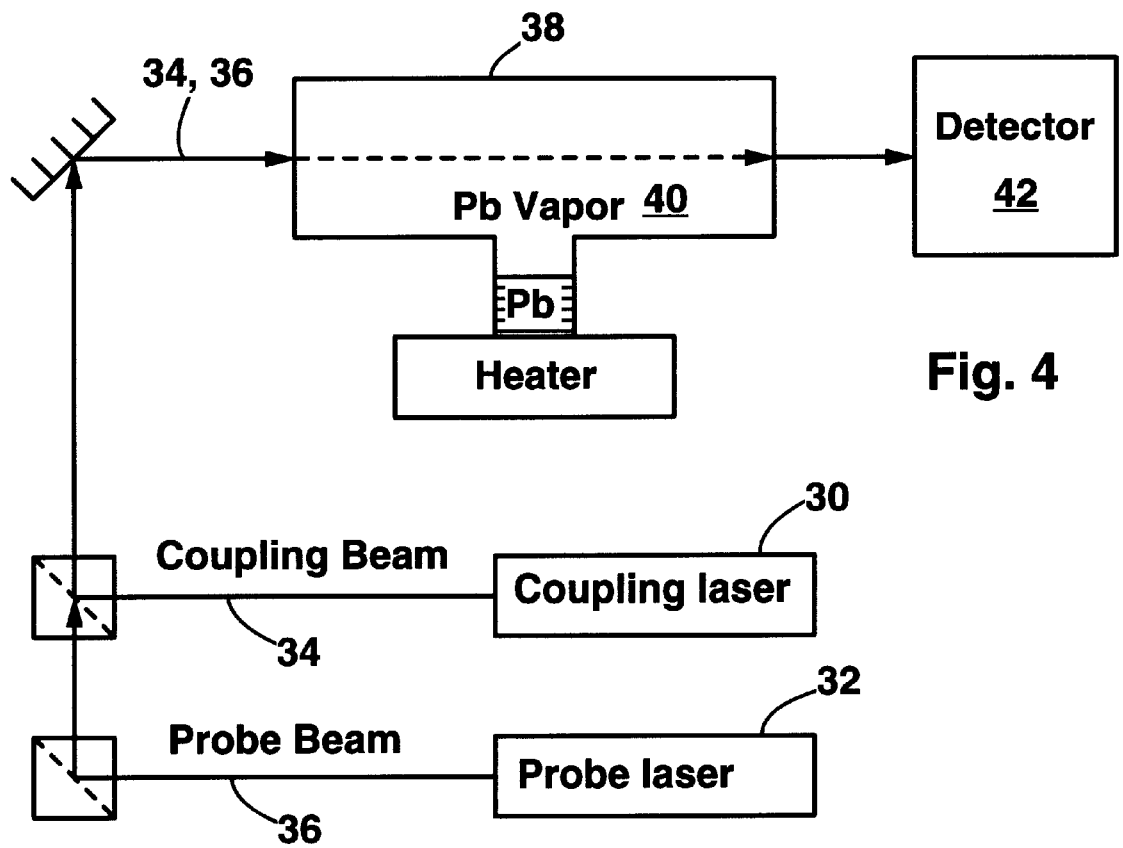
FIG. 4 shows an apparatus capable of producing EIT in lead vapor.

FIG. 4 shows an apparatus capable of performing the method of the present invention, as well as EIT methods known in the art. A coupling laser 30 and probe laser 32 provide a coupling beam 34 and probe beam 36. The coupling beam and probe beam are directed into a cell 38 filled with lead vapor 40. A detector 42 monitors the portion of the probe beam 36 that is transmitted through the cell 38. Prior art methods require the use of lead that is isotopically pure and of an isotope that has no nuclear magnetic moment and hence no hyperfine split levels. Methods of the present invention permit the use of hyperfine-split atomic species (e.g. $^{207}$Pb) and mixed isotopes (e.g. mixtures of $^{208}$Pb and $^{207}$Pb) in the cell 38.

Figure 5:
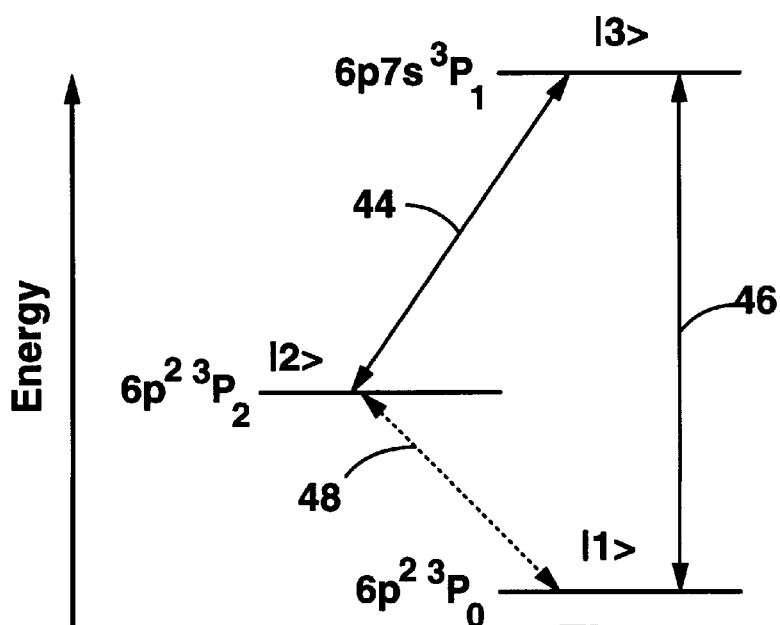
FIG. 5 (PRIOR ART) shows an energy level structure of $^{208}$Pb.

A prior art method of producing EIT employs 99.9% pure $^{208}$Pb vapor in the cell 38. $^{208}$Pb has no nuclear magnetic moment, and hence, no hyperfine split levels. Reference can be made to U.S. Pat. No. 5,771,117 concerning the details of EIT in $^{208}$Pb vapor. FIG. 5 shows the pertinent energy levels in $^{208}$Pb for generating EIT. The levels |1>, |2> and |3> shown specify energies for both valence electrons. Level |1> ($6p^{23}P_0$) is the ground level for the two valence electrons in lead. Coupling beam 34 is resonant with transition 44, and probe beam 36 is resonant with transition 46. Transition 46 is rendered transparent by the coupling beam 34. Transition 48 is dipole forbidden.

Figure 6:
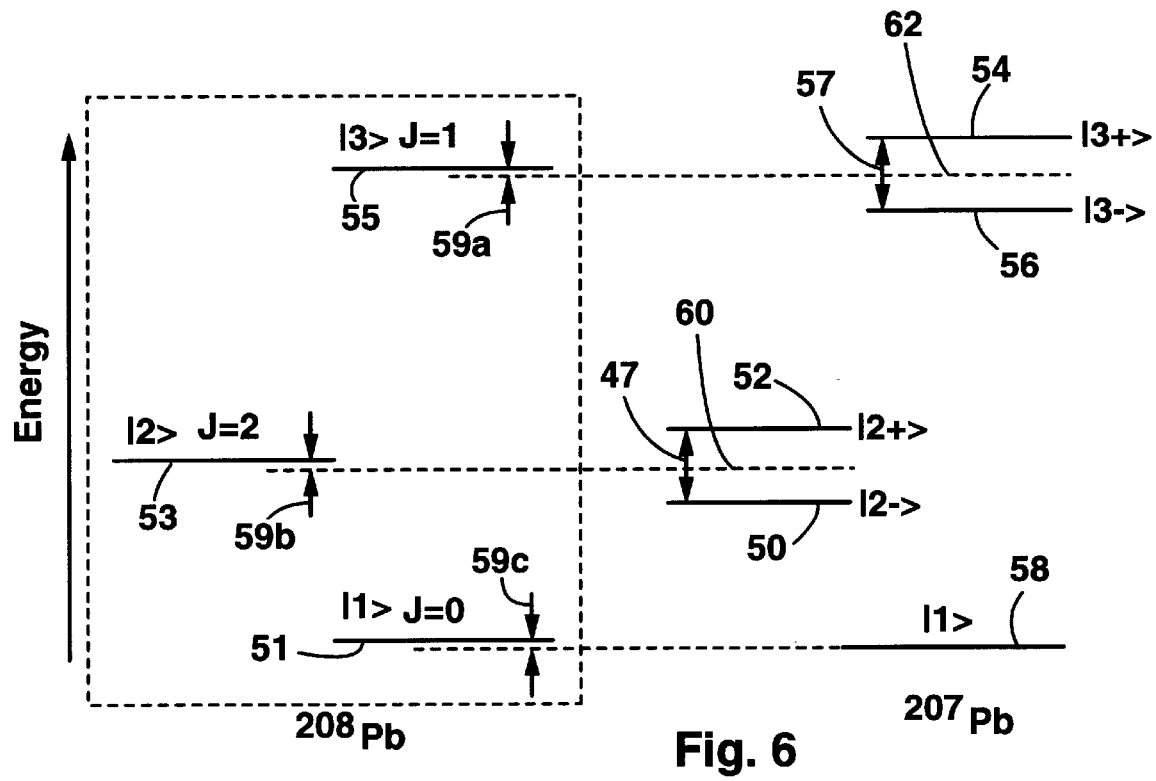
FIG. 6 shows the energy level structure of $^{208}$Pb superposed with the energy level structure of $^{207}$Pb.

In a specific illustrative embodiment of the present invention, EIT is produced in pure $^{207}$Pb vapor in the cell 38. FIG. 6 shows the energy level structure for $^{207}$Pb superposed with the energy level structure of $^{208}$Pb. $^{207}$Pb has a nonzero nuclear magnetic moment, and therefore has hyperfine split levels. All levels are hyperfine split for which the total angular momentum J 0. J is the spin (S)+orbital (L) electron angular momentum for both valence electrons; J for level |1> is given by '0' in the notation $6p^{23}P_0$. Level |1> 58 of $^{207}$Pb is not hyperfine split since it has J=0. Levels |2> and |3> in $^{207}$Pb are both hyperfine split since they have J=2 and J=1, respectively. All levels in $^{207}$Pb which are hyperfine split are split into two levels; one is higher energy than the corresponding $^{208}$Pb level, and one is lower energy than the corresponding $^{208}$Pb level. This is because lead has nuclear spin=½. Other atomic species with different nuclear spins will have different numbers of hyperfine split levels.

Hyperfine splitting of level |2> 53 of $^{208}$Pb produces levels |2+> 50 and |2–> 52 in $^{207}$Pb. Hyperfine splitting of level |3> 55 of $^{208}$Pb produces levels |3+> 54 and |3–> 56 in $^{207}$Pb. Level |1> 58 is unsplit due to its zero total angular momentum, J=0. Levels |2+> 50 and |2–> 52 have a center of gravity (COG) 60, and levels |3+> 54 and |3–> 56 have a center of gravity (COG) 62. The |2> and |3> COGs 60, 62 are not necessarily equidistant from levels 50, 52, and 54, 56, respectively. The level |2> hyperfine split levels 50, 52 are split by an energy difference 47. The level |3> hyperfine split levels 54, 56 are split by an energy difference 57. Differences 47 and 57 are not necessarily equal. Also, differences 47 and 57 are important parameters in generating EIT in hyperfine split atoms, as will be discussed below. The center of gravity 60, 62 of hyperfine split levels is well known in the art and depends upon the splitting energy (e.g. difference 57) and the degeneracy of the split levels (e.g. levels 54 and 56).

It is important to note that COG 60 and COG 62 in $^{207}$Pb are close to, but not exactly coincident with levels |2> 53 and |3> 55 in $^{208}$Pb, respectively. Also, level |1> 51 in $^{208}$Pb is not exactly coincident with level |1> 58 in $^{207}$Pb. An isotope shift 59a, 59b, 59c causes the corresponding levels (or COGs) in $^{208}$Pb and $^{207}$Pb to be slightly different in energy. The isotope shift is well known in the art. For more information concerning centers of gravity of hyperfine split levels, reference can be made to *The Theory of Atomic Structure and Spectra*, by R. D. Cowan, University of California, Berkeley, 1981.

It is important to note that, in the definition of COG used in the present application, an unsplit level is coincident with its own center of gravity. For example, level |1> 58 in $^{207}$Pb is unsplit, and hence can be considered to be located at its own center of gravity.

Figure 7:
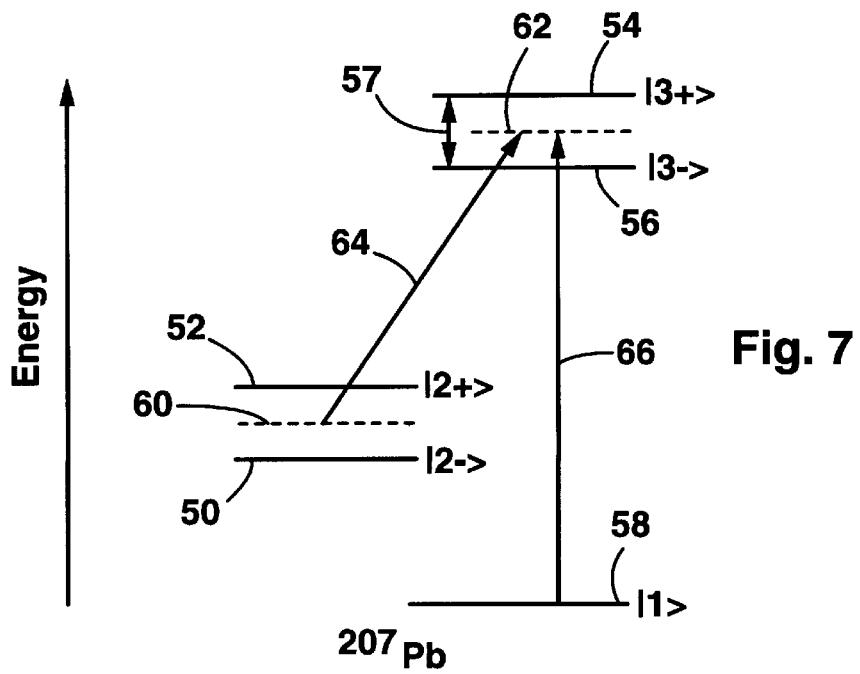
FIG. 7 shows how EIT is produced in $^{207}$Pb according to the present invention.

FIG. 7 illustrates a method of the present invention in which EIT is produced in pure $^{207}$Pb vapor. In operation, the coupling beam 34 is tuned into resonance with transition 64 between |2> COG 60 and |3> COG 62. The probe beam 36 is tuned into resonance with transition 66 between level |1> 58 and COG 62. This tuning of the coupling and probe beams results in the production of EIT in the pure $^{207}$Pb vapor, provided that the coupling beam has sufficient energy and intensity. Both the coupling beam and probe beam can be detuned (one-photon detuning) from transitions 64, 66 respectively, provided that the coupling beam and probe beam frequencies differ by an amount which corresponds with the energy difference between level |1> 58 and the |2> COG 60. In other words, it is most important for the frequency difference between the coupling and probe beams to correspond with the energy difference between level |1> 58 and |2> COG 60. It is preferable for the coupling and probe beams to be resonant with transitions 64, 66.

Figure 8:
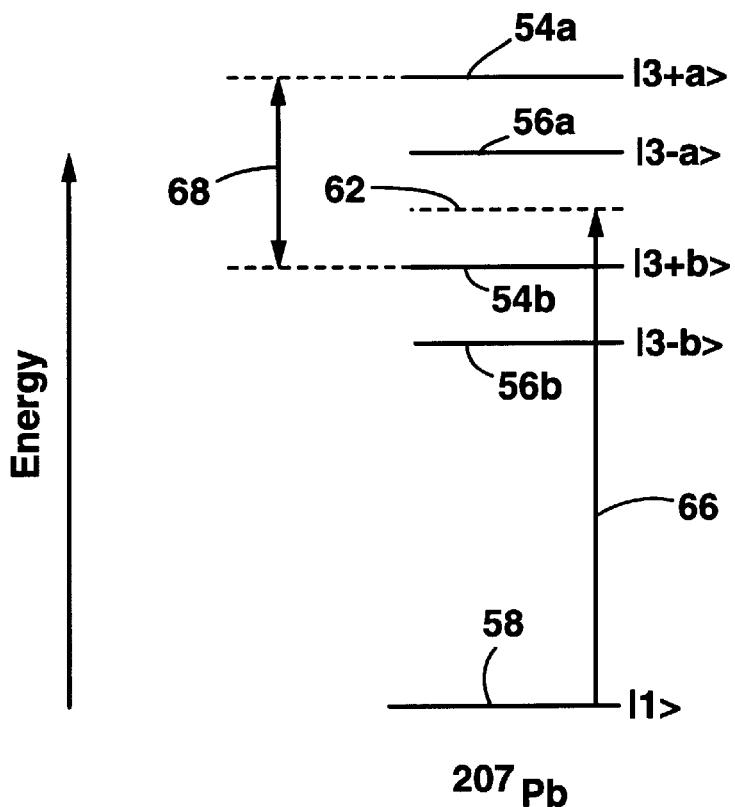
FIG. 8 further illustrates EIT in $^{207}$Pb.

FIG. 8 shows an energy level diagram for $^{207}$Pb with only the coupling beam 34 applied. The coupling beam causes levels |3+> 54 and |3-> 56 to be combined with levels |2+> 52 and |2-> 50, producing levels |3+a> 54a, |3+b> 54b, |3-a> 56a and |3-b> 56b. A splitting in these levels caused by the coupling beam has a characteristic energy difference 68 which is approximately equal to the Rabi frequency of the coupling beam:

$$\Omega = \frac{2\pi\mu_{23}E}{h}$$

where $\mu_{23}$ is the coupling coefficient between levels |2> and |3> in $^{208}$Pb, and E is the electric field of the coupling beam.

When the probe beam is tuned to transition 66, and applied to the $^{207}$Pb atoms with the energy levels of FIG. 8, destructive quantum interference occurs between levels |3+a> 54a, |3+b> 54b, |3-a> 56a and |3-b> 56b. Therefore, transition 66 cannot absorb energy from the probe beam, and the $^{207}$Pb exhibits EIT.

It has been shown both theoretically and experimentally that EIT can be achieved in cases where the coupling beam and probe beam are not tuned exactly into resonance with transitions 64 and 66. Dewtuning of the coupling and probe beams can still provide EIT if a frequency difference between the coupling and probe beams corresponds with the energy difference between COG |2> 60 and level |1> 58 (or COG |1> if level |1> is hyperfine split). This condition is known as two-photon resonance. With two photon resonance, the coupling beam intensity required for EIT scales linearly with the common detuning of coupling and probe beam from transitions 64, 66.

Figure 9:
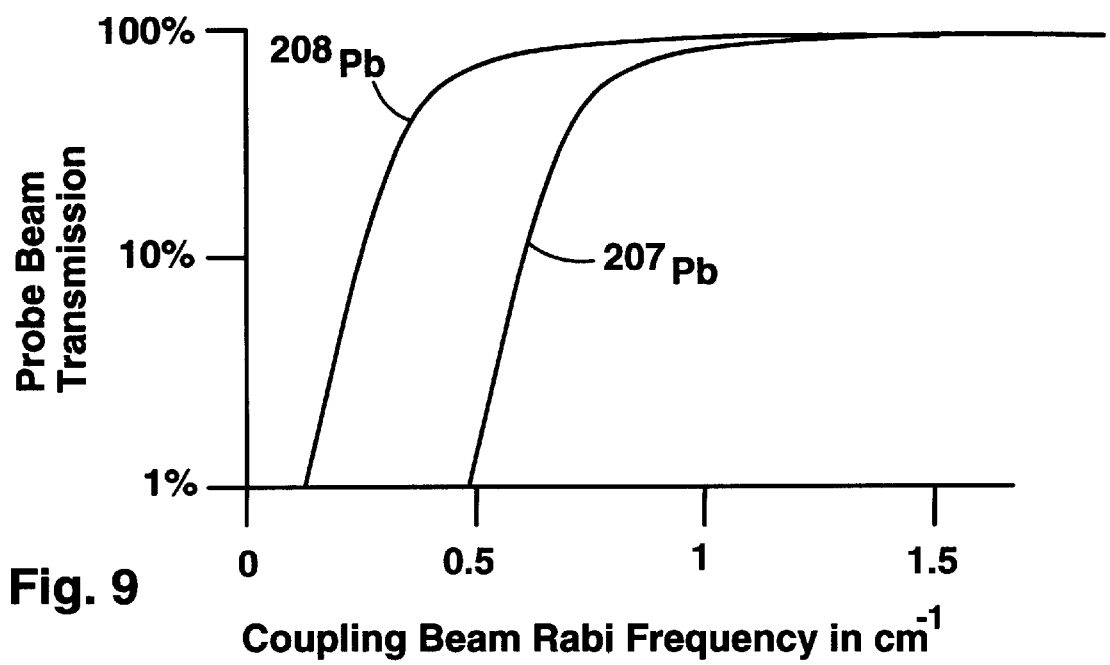
FIG. 9 is a graph showing transparency vs. coupling beam Rabi frequency in pure $^{207}$Pb and pure $^{208}$Pb.

In the methods of the present invention, the Rabi frequency 68 must be greater than the larger of the two energy differences 47 and 57. Since the Rabi frequency 68 is only controllable by adjusting the intensity of the coupling beam, the minimum frequency constraint on the Rabi frequency translates into a minimum intensity constraint on the coupling beam 34. Preferably, for maximum EIT effect, the Rabi frequency 68 should be several times (e.g. 3–5 times) greater than the larger of the two the hyperfine energy differences 47, 57. Therefore, EIT in pure $^{207}$Pb generally requires a more intense coupling beam than EIT in pure $^{208}$Pb. FIG. 9 is a graph of transmission vs. Rabi frequency for pure $^{208}$Pb and for pure $^{207}$Pb. For this graph, the coupling beam and probe beam were tuned to the COGs for $^{207}$Pb, the atom density in the cell was $5\times10^{14}$ atoms/cm$^3$ for $^{208}$Pb and $^{207}$Pb, and the cell was 10 cm long. In $^{207}$Pb, difference 57 is larger than difference 47, and the larger difference 57 is about 0.1 cm$^{-1}$.

It is noted that transition 64 in $^{207}$Pb has very nearly the same energy as transition 44 in $^{208}$Pb, and transition 66 in $^{207}$Pb has very nearly the same energy as transition 66 in $^{207}$Pb (level |2> COG 60 in $^{207}$Pb is very close to the energy location of level |2> in $^{208}$Pb and COG location 62 in $^{207}$Pb is very close to the energy location of level |3> in $^{208}$Pb). Because the transitions 44 & 64 and 46 & 66 in $^{207}$Pb and $^{208}$Pb are so close in energy, the coupling and probe beam tunings for producing EIT in $^{207}$Pb also produce EIT in $^{208}$Pb. Therefore, the present method of tuning the coupling and probe lasers to transitions between COGs can be used on a mixture of $^{207}$Pb and $^{208}$Pb, as well as other isotopes of lead.

However, slight isotope shifts 59a, 59b, 59c in the relevant energy levels of $^{207}$Pb and $^{208}$Pb result in slightly different optimum tunings for the two isotopes. A coupling beam tuned for optimum EIT in $^{207}$Pb, for example, will produce slightly less than optimum EIT in $^{208}$Pb, and vice versa. For optimum EIT in $^{207}$Pb, the coupling beam and probe beam should be tuned exactly to transitions between the COGs 60, 62 and level |1> (i.e. transitions 64, and 66). For optimum EIT in $^{208}$Pb, the coupling beam and probe beam should be tuned exactly to transitions between levels |1>, |2> and |3> (i.e. transitions 44, and 46). Levels |2> and |3> in $^{208}$Pb are not exactly coincident with COGs 60, 62 in $^{207}$Pb. This is due to the well known isotope shift as explained above. In comparing transitions 44 (in $^{208}$Pb) and 64 (in $^{207}$Pb), the isotopic shift is $4\times10^{-4}$ cm$^{-1}$; in comparing transitions 46 (in $^{208}$Pb) and 66 (in $^{207}$Pb), the isotopic shift is 0.05 cm$^{-1}$. These isotope shifts are small enough to permit EIT in a mixture of $^{208}$Pb and $^{207}$Pb. However, due to the isotope shift, the maximum attainable EIT will be greater in isotopically pure $^{207}$Pb or $^{208}$Pb than in a mixture of the two.

In a particular embodiment of the present invention, a reference apparatus employing pure $^{208}$Pb is used to tune the coupling and probe beams. The couplings beam tuned for $^{208}$Pb is then used to produce EIT in $^{207}$Pb.

The method of the present invention has been used to demonstrate EIT in a mixture of 92% $^{207}$Pb, 6% $^{208}$Pb and 2% $^{206}$Pb, and in a mixture of 25% $^{207}$Pb, 50% $^{208}$Pb and 25% $^{206}$Pb (the natural isotopic distribution of lead). $^{206}$Pb has an isotope shift relative to $^{207}$Pb. However, the isotope shift of $^{206}$Pb is small enough to permit EIT in a mixture of $^{207}$Pb and $^{206}$Pb. The isotope shift between $^{206}$Pb and $^{208}$Pb is also small enough to permit simultaneous EIT in these two species.

In mixtures having unequal proportions of isotopes, it may be desirable to slightly adjust the coupling beam and probe beam tunings to be commensurate with the relative proportions of the isotopes. For example, if a particular mixture of lead isotopes has a large proportion of $^{206}$Pb, then the coupling and probe beams should be tuned closer to resonance for $^{206}$Pb. This method will tend to maximize the EIT effect in a mixture.

The effect of isotopic shift is relatively small for heavy atomic species (such as lead) and relatively large for light atomic species. The method for producing EIT in isotopically mixed materials works best for heavy atomic species because the isotopic shifts between different isotopes is relatively small. The physics of energy level isotope shifts is well known in the art. In the case of isotopically mixed materials, the present invention works best where the isotope shifts between the different isotopes are substantially less than the hyperfine splittings of the associated levels. Preferably, the isotope shift is less than 1/10 of the hyperfine splitting energy of the corresponding level.

Tuning problems caused by isotope shifts can be reduced or eliminated by increasing the Rabi frequency of the coupling beam (i.e. increasing the intensity of the coupling beam). This is because an increase in the Rabi frequency increases splitting 68, thereby reducing the absorption of the probe beam over a wider spectral range. Increasing the Rabi frequency of the coupling beam always increases the transparency of the material to the probe beam.

It is noted that, in the present application, ground level |1> is defined as being the lowest energy level. Level |2> is defined as being the level which is dipole forbidden to decay to the lowest level |1>. Level |3> is defined as being the level which has dipole allowed transitions to both level |2> and the level |1>.

Within the scope of the present invention, it is not necessary for the hyperfine split levels to be levels |2> and |3>, as in the case of $^{207}$Pb. It is noted that level |3> might be hyperfine split. For EIT to be possible, transition |1> to |2> must be dipole forbidden, and transitions |1> to |3> and |2> to |3> must be dipole allowed. Dipole transitions are possible between levels which have opposite parity and which obey the appropriate angular momentum selection rules, which are well known in the art. With these rules in mind, it is possible to determine different combinations of hyperfine split and non-hyperfine split levels that can exhibit EIT. A noncomprehensive list of three different cases are presented in the table below:

| Case | Level |1> | Level |2> | Level |3> |
|------|-----------|-----------|-----------|
| 1 | unsplit (J = 0) | HF split | HF split |
| 2 | HF split | unsplit (J = 0) | HF split |
| 3 | HF split | HF split | HF split |

$^{207}$Pb is a specific example of case 1.

Figure 10:
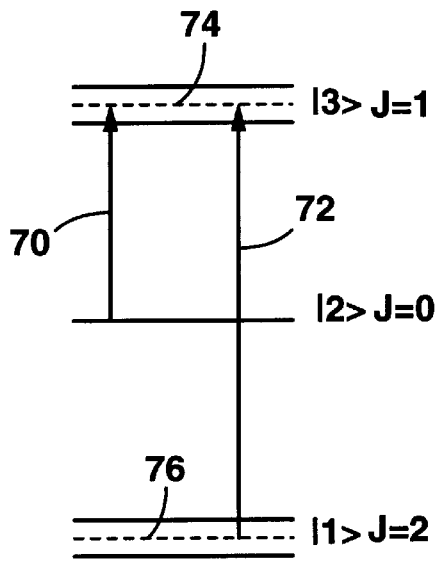
FIGS. 10–11 show other energy level structures in which EIT can be produced according to the present invention.

FIG. 10 shows a set of energy levels according to case #2 in the table above. Level |1> has J=2 and is hyperfine split, level |2> has J=0 and is not hyperfine split, and level |3> has J=1 and is hyperfine split. Lines 74, 76 illustrate the level |3> COG and level |1> COG, respectively. In producing EIT in the system of FIG. 10, the coupling beam is tuned into resonance with transition 70 (between level |2> and |3> COG 74), and the probe beam is tuned into resonance with transition 72 (between level |1> COG 76 and level |3> COG 74).

Figure 11:
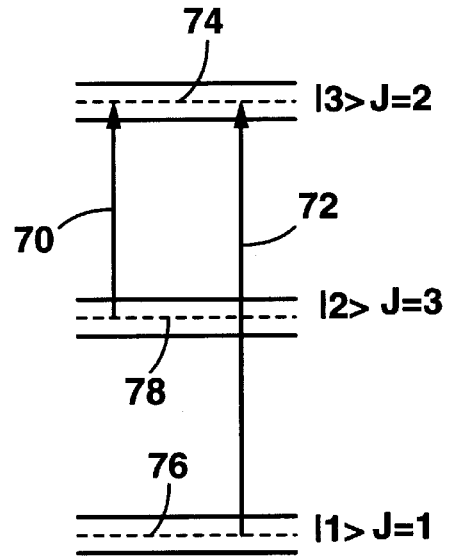

FIG. 11 shows a set of energy levels according to case #3 in the table above. Here, levels |1>, |2>, and |3> are all hyperfine split, with total angular momentum values of J=1, J=3, and J=2, respectively. Lines 76, 78, and 74 illustrate the level |1> COG, level |2> COG, and level |3> COG, respectively. In producing EIT in the system of FIG. 11, the coupling beam is tuned into resonance with transition 70 (between level |2> COG 78 and |3> COG 74), and the probe beam is tuned into resonance with transition 72 (between level |1> COG 76 and level |3> COG 74).

Figure 12:
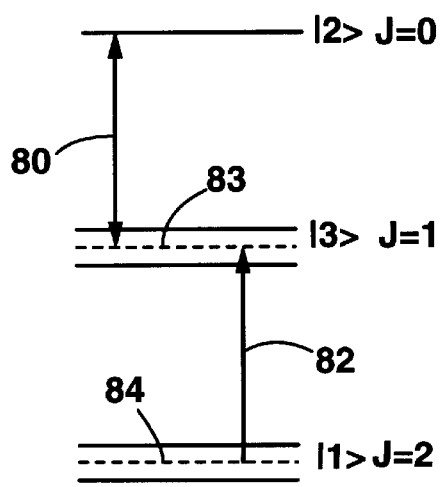
FIG. 12 shows a ladder system with hyperfine split in which EIT can be produced according to the present invention.

It is further noted that level |2> can have an energy higher than level |3>. Such a system is illustrated in FIG. 12 and is called a ladder system. In the example of FIG. 12, levels |1> and |2> are hyperfine split. Transition 80 extends between level |3> COG 83 and level |2>. Transition 82 extends between level |1> COG 84 and level |3> COG 83. To generate EIT, the coupling beam is tuned into resonance with transition 80, and the probe beam is tuned into resonance with transition 82. EIT can also be produced using one-photon detuning. In this case, the coupling beam and probe beam are tuned so that the sum of the coupling beam frequency and the probe beam frequency sum corresponds with an energy difference between |1> COG and |2> COG.

In the case of $^{207}$Pb the Rabi frequency of the coupling beam is preferably greater than the larger of either difference 47 and 57. This is also true in the general case of applying the present method to atoms besides $^{207}$Pb. No matter what the energy level structure is, it is best for the Rabi frequency of the coupling beam to be greater than the larger of the hyperfine splitting energy of level |2> and level |3>. Due to this requirement, performing EIT with hyperfine split atoms according to the present invention generally requires that the coupling beam has a higher intensity than when performing EIT with non-hyperfine split atoms. Hyperfine splitting of level |1> has a very small effect on the minimum Rabi frequency required and generally does not need to be considered.

More preferably, the Rabi frequency of the coupling beam is at least 5 times greater than the larger of either difference 47 and 57. Most preferably, the Rabi frequency of the coupling beam is at least 8 times greater than the larger of either difference 47 and 57. Simply put, the more intense the coupling beam, the more complete the EIT effect, and the more preferable the operation of an EIT device based upon the present method.

Figure 13:
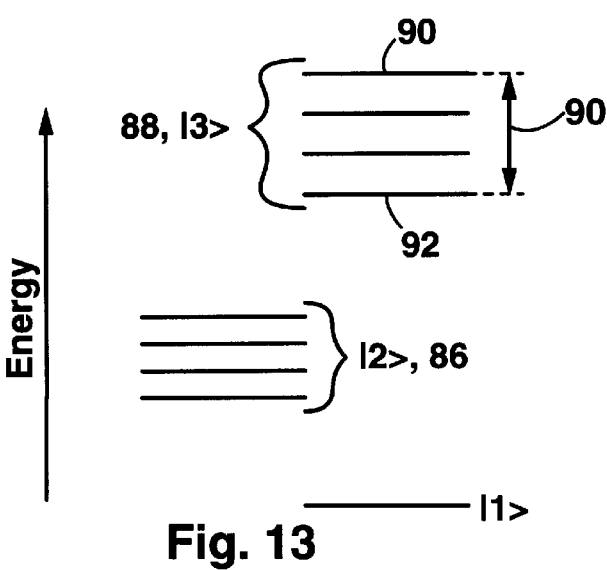
FIG. 13 shows an energy level structure for an atom with nuclear spin=3/2.

In atoms with nuclear spin greater than ½, each hyperfine split level is split into more than 2 levels. This is illustrated in FIG. 13, which shows energy levels for an atom with nuclear spin=3/2. Level |2> 86 and level |3> 88 are each split into 4 sublevels. An energy difference 90 which establishes the minimum suggested Rabi frequency of the coupling beam is the difference between the highest 92 and lowest 94 hyperfine split sublevels. The energy difference 90 is often referred to as the hyperfine splitting energy (i.e. the hyperfine splitting energy is understood to be the largest difference in energy between all the hyperfine split sublevels of a particular energy level). This concept extends to atoms with any value of nuclear spin.

For best results in producing EIT, the total number of photons in the coupling beam should exceed the local oscillator strength weighted number of atoms in the path of the coupling beam. The weighting factor is based on the strengths of the allowed transitions (64 and 66 in the case of $^{207}$Pb). Reference can be made to *Preparation Energy for Electromagnetically Induced Transparency*, by S. E. Harris et al. in *Physical Review*, August, 1995, A 52, R928-931 concerning the requirements of the total energy of the coupling beam.

The method of the present invention is capable of producing EIT in high opacity samples of hyperfine split atomic species. Opacity is a dimensionless quantity defined as NσL, where N is the density, σ is the atomic cross section (a fundamental property of the atomic species), and L is the length of the sample. Transmission of the probe beam through the sample without the coupling beam is approximately proportional to exp(-NσL). High density is defined in the present application as being densities where NσL>>1. For example, the method of present invention can provide about 95% transmission of the probe beam through $^{207}$Pb vapor sample having an initial (i.e. without the coupling beam) opacity of about 1–3×10$^6$.

By comparison, prior art methods of tuning the coupling and probe beams to discrete hyperfine transitions (i.e., in FIG. 7, tuning the beams to transitions between levels 50, 52, 54,. 56, and 58 and not to transitions between centers of gravity 60, 62) are generally limited to samples with NσL<1.

The method of the present invention can be used for nonlinear sum and difference frequency generation. Methods of nonlinear sum and difference generation using EIT are described in U.S. Pat. No. 5,771,117 to Harris et al. The present methods of producing EIT are directly applicable to nonlinear sum and difference generation in the same manner as prior art methods of producing EIT. FIG. 14 shows an energy level diagram of a hyperfine split atom capable of providing sum generation according to a method of the present invention. The energy level structure of the atom includes a level |k>. The requirements for level |k> are known in the art and can be found in U.S. Pat. No. 5,771,117. In operation, the coupling beam and probe beam are applied to the atom, thereby populating level $|2\rangle$ 100 and establishing a condition where the atom acts as a driven local oscillator, as is known in the art. Then, an input beam 101 is applied to the atom. The input beam is tuned into resonance with transition 102, which extends between a COG 104 of level $|2\rangle$ and level $|k\rangle$ 100. The excited electron in level $|k\rangle$ then decays via transition 106, emitting a photon. The emitted photons form a generated beam 105. The generated beam has a frequency greater than the frequency of the input beam 101. The frequency difference between the input beam 101 and generated beam 105 corresponds with the energy difference 107 between level $|1\rangle$ 108 and $|2\rangle$ COG 104. In the case where level $|1\rangle$ is hyperfine split, the frequency difference would correspond with an energy difference between $|2\rangle$ COG 104 and a COG of level $|1\rangle$ (not shown). Several other mechanisms for sum and difference generation are shown in U.S. Pat. No. 5,771,117. The present methods for producing EIT are directly applicable to these other mechanisms.

FIG. 15 shows an apparatus for providing nonlinear frequency generation according to the present invention. The apparatus includes an input laser 112 for providing the input beam 101. The generated beam 105 is produced by the lead vapor within the cell.

An important consideration in performing the method of the present invention for nonlinear optical applications is the resultant index of refraction of the EIT material. For nonlinear optical applications, it is highly desired to have the refractive index of the material equal 1 (n=1). For this to happen, the net dipole moment of the EIT atoms must be zero. It is often the case that level $|1\rangle$ is degenerate. In this case, dipole moment=0 and n=1 is assured if the degenerate states of level $|1\rangle$ have a thermal population distribution (i.e. each state is equally populated) at the moment when the coupling and probe beams are applied. The atoms in the different degenerate level $|1\rangle$ states evolve separately through different states in levels $|2\rangle$ and $|3\rangle$, and will have equal and opposite dipole moments. Therefore, equal numbers of atoms in the initial degenerate states results in net dipole moment=0 for a macroscopic sample.

$^{207}$Pb represents a special case, however. In $^{207}$Pb, dipole moment=0 and n=1 are necessarily produced if the coupling and probe beams are linearly polarized-even if a thermal population distribution is not present in level $|1\rangle$ (which is doubly degenerate). If the coupling and probe beams are circularly polarized, then the $^{207}$Pb atoms must have an initial thermal population distribution in order to produce dipole moment=0 and n=1. Other special cases may also exist for providing dipole moment=0 and n=1 without needing an initial thermal population distribution in the degenerate states of level $|1\rangle$.

Although the present invention has been explained mainly in terms of $^{207}$Pb, the methods of the present invention are directly applicable to any hyperfine split atoms with any amount of nuclear spin (i.e. not just nuclear spin=½ atoms as in the case of $^{207}$Pb).

Most generally, the method of the present invention includes the step of tuning the coupling and probe beams into resonance with transitions between the centers of gravity (COG) of hyperfine split levels. Also, the method of the present invention preferably includes the step of adjusting the power of the coupling beam such that the Rabi frequency of the coupling beam exceeds the hyperfine energy level splitting of both levels $|2\rangle$ and $|3\rangle$.

It is further noted that the method of the present invention is applicable to mixtures of isotopes where all the isotopes in the mixture have hyperfine split levels. In such a case, the COGs of corresponding levels in the different isotopes will be displaced by the isotope shift.

It will be clear to one skilled in the art that the above embodiment may be altered in many ways without departing from the scope of the invention. Accordingly, the scope of the invention should be determined by the following claims and their legal equivalents.

What is claimed is:

1. A method for producing electromagnetically induced transparency in atoms of an isotope having nonzero nuclear spin, the method comprising the steps of:
   a) selecting the isotope such that the atoms of the isotope have electronic levels ($|1\rangle$, $|2\rangle$, and $|3\rangle$, wherein:
      I) level $|1\rangle$ has the lowest energy of levels $|1\rangle$, $|2\rangle$ and $|3\rangle$;
      II) a transition between level $|2\rangle$ and level $|1\rangle$ is dipole forbidden;
      III) a transition between level $|1\rangle$ and level $|3\rangle$ is dipole allowed;
      IV) a transition between level $|2\rangle$ and level $|3\rangle$ is dipole allowed; and
      V) at least one of levels $|1\rangle$, $|2\rangle$ and $|3\rangle$ is hyperfine split;
      VI) levels $|1\rangle$, $|2\rangle$, and $|3\rangle$ each have a center of gravity, hereinafter referred to as COG $|1\rangle$, COG$|2\rangle$, and COG $|3\rangle$, respectively;
   b) applying to the atoms a coupling beam, wherein the coupling beam is substantially resonant with a first transition that extends between the COG $|2\rangle$ and the COG $|3\rangle$;
   c) applying to the atoms a probe beam, wherein the probe beam is substantially resonant with a second transition that extends between the COG $|1\rangle$ and the COG $|3\rangle$.

2. The method of claim 1 wherein COG $|3\rangle$ has a higher energy than COG $|2\rangle$, and further comprising the step of detuning the coupling beam from the first transition and detuning the probe beam from the second transition such that a frequency difference between the coupling beam and the probe beam corresponds to an energy difference between COG $|1\rangle$ and COG $|2\rangle$.

3. The method of claim 1 wherein COG $|2\rangle$ has a higher energy than COG $|3\rangle$, and further comprising the step of detuning the coupling beam from the first transition and detuning the probe beam from the second transition such that a frequency sum of the coupling beam and the probe beam corresponds to an energy difference between COG $|1\rangle$ and COG $|2\rangle$.

4. The method of claim 1 wherein:
   a) COG $|3\rangle$ has a higher energy than COG $|2\rangle$; and
   b) the atom has a level $|k\rangle$;
   the method further comprising the step of applying to the atom an input beam resonant with a transition between the COG $|2\rangle$ and level $|k\rangle$, whereby a generated beam is produced, a frequency difference between the generated beam and the input beam being equal to a frequency difference between the coupling beam and the probe beam.

5. The method of claim 1 wherein:
   a) the COG $|2\rangle$ has a higher energy than COG $|3\rangle$, and
   b) the atom has a level $|k\rangle$,
   the method further comprising the step of applying to the atom an input beam resonant with a transition between the COG $|2\rangle$ and level $|k\rangle$, whereby a generated beam is produced, a frequency difference between the generated beam and the input beam being equal to a frequency sum of the coupling beam and the probe beam.

6. The method of claim 1 wherein a Rabi frequency of the coupling beam is larger than the largest of:
   a) the hyperfine splitting energy of level $|2>$, and
   b) the hyperfine splitting energy of level $|3>$.

7. The method of claim 1 wherein a Rabi frequency of the coupling beam is at least 5 times as large as the largest of:
   a) the hyperfine splitting energy of level $|2>$, and
   b) the hyperfine splitting energy of level $|3>$.

8. The method of claim 1 wherein a Rabi frequency of the coupling beam is at least 8 times as large as the largest of:
   a) the hyperfine splitting energy of level $|2>$, and
   b) the hyperfine splitting energy of level $|3>$.

9. The method of claim 1 wherein the atoms are $^{207}$Pb atoms.

10. The method of claim 9 wherein the coupling beam and probe beam are linearly polarized.

11. The method of claim 1 wherein the atoms have a thermal population distribution before the coupling beam and probe beam are applied.

12. A method for producing electromagnetically induced transparency in a material comprising at least two different isotopes of the same element, the method comprising the steps of:
   a) selecting a first isotope with zero nuclear spin, the first isotope having electronic levels $|1>$, $|2>$, and $|3>$ wherein:
      I) level $|1>$ has the lowest energy of levels $|1>$, $|2>$ and $|3>$;
      II) a transition between level $|2>$ and level $|1>$ is dipole forbidden;
      III) a transition between level $|1>$ and level $|3>$ is dipole allowed;
      IV) a transition between level $|2>$ and level $|3>$ is dipole allowed;
   b) selecting a second isotope with nonzero nuclear spin, the second isotope having electronic levels $|4>$, $|5>$, and $|6>$, wherein:
      I) level $|4>$ the lowest energy of levels $|4>$, $|5>$ and $|6>$;
      II) a transition between level $|5>$ and level $|4>$ is dipole forbidden;
      III) a transition between level $|4>$ and level $|6>$ is dipole allowed;
      IV) a transition between level $|5>$ and level $|6>$ is dipole allowed;
      V) at least one of levels $|4>$, $|5>$, and $|6>$ is hyperfine split,
      VI) levels $|4>$, $|5>$, and $|6>$ each have a center of gravity, hereinafter referred to as COG $|4>$, COG $|5>$ and COG $|6>$, respectively;
      VII) the COG $|4>$ is substantially coincident with level $|1>$, the COG $|5>$ is substantially coincident with level $|2>$, and the COG $|6>$ is substantially coincident with level $|3>$;
   c) incorporating the first isotope and the second isotope into the material;
   d) applying to the material a coupling beam, wherein the coupling beam is tuned to be substantially resonant with a first transition and substantially resonant with a second transition, wherein the first transition extends between the COG $|5>$ and the COG $|6>$, and wherein the second transition extends between level $|2>$ and level $|3>$;
   e) applying to the material a probe beam, wherein the probe beam is tuned to be substantially resonant with a third transition and substantially resonant with a fourth transition, wherein the third transition extends between the COG $|4>$ and COG $|6>$, and wherein the fourth transition extends between level $|1>$ and level $|3>$.

13. The method of claim 12 wherein level $|3>$ has a higher energy than level $|2>$ and COG $|6>$ has a higher energy than COG $|5>$, the method further comprising the step of detuning the coupling beam and detuning the probe beam such that a frequency difference between the coupling beam and the probe beam corresponds to an energy difference between level $|1>$ and level $|2>$ and corresponds to an energy difference between COG $|5>$ and COG $|6>$.

14. The method of claim 12 wherein level $|2>$ has a higher energy than level $|3>$ and COG $|5>$ has a higher energy than COG $|6>$, the method further comprising the step of detuning the coupling beam and the probe beam such that a frequency sum of the coupling beam and the probe beam corresponds to an energy difference between level $|1>$ and level $|2>$ and corresponds to an energy difference between COG $|5>$ and COG $|6>$.

15. The method of claim 12 wherein:
   a) level $|3>$ has a higher energy than level $|2>$; and
   b) the first isotope has a level $|k>$;
   the method further comprising the step of applying to the material an input beam tuned to a transition between level $|2>$ and level $|k>$, whereby a generated beam is produced, a frequency difference between the generated beam and the input beam being equal to a frequency difference between the coupling beam and the probe beam.

16. The method of claim 12 wherein:
   a) COG $|6>$ has a higher energy than COG $|5>$, and
   b) the second isotope has a level $|k>$,
   the method further comprising the step of applying to the material an input beam tuned to a transition between the COG $|5>$ and level $|k>$, whereby a generated beam is produced, a frequency difference between the generated beam and the input beam being equal to a frequency difference between the coupling beam and the probe beam.

17. The method of claim 12 wherein:
   a) level $|2>$ has a higher energy than level $|3>$, and
   b) the first isotope has a level $|k>$,
   the method further comprising the step of applying to the material an input beam tuned to a transition between level $|2>$ and level $|k>$, whereby a generated beam is produced, a frequency difference between the generated beam and the input beam being equal to a frequency sum of the coupling beam and the probe beam.

18. The method of claim 12 wherein:
   a) COG $|5>$ has a higher energy than COG $|6>$, and
   b) the second isotope has a level $|k>$,
   the method further comprising the step of applying to the material an input beam tuned to a transition between COG $|5>$ and level $|k>$, whereby a generated beam is produced, a frequency difference between the generated beam and the input beam being equal to a frequency sum of the coupling beam and the probe beam.

19. The method of claim 12 wherein a Rabi frequency of the coupling beam is larger than the largest of:
   a) the hyperfine splitting energy of level $|5>$, and
   b) the hyperfine splitting energy of level $|6>$.

20. The method of claim 12 wherein a Rabi frequency of the coupling beam is at least 5 times as large as the largest of:
   a) the hyperfine splitting energy of level $|5>$, and b) the hyperfine splitting energy of level $|6\rangle$.

21. The method of claim 12 wherein a Rabi frequency of the coupling beam is at least 8 times as large as the largest of:
    a) the hyperfine splitting energy of level $|5\rangle$, and
    b) the hyperfine splitting energy of level $|6\rangle$.

22. The method of claim 12 wherein the second isotope is $^{207}$Pb.

23. The method of claim 12 wherein the first isotope is $^{206}$Pb.

24. The method of claim 12 wherein the first isotope is $^{208}$Pb.

25. The method of claim 12 wherein the first and second isotopes are further selected such that an isotope shift between level $|2\rangle$ and COG $|5\rangle$ is less than 1/10 of the hyperfine splitting energy of level $|5\rangle$.

26. The method of claim 12 wherein the first and second isotopes are further selected such that an isotope shift between level $|3\rangle$ and COG $|6\rangle$ is less than 1/10 of the hyperfine splitting energy of level $|6\rangle$.

27. The method of claim 12 wherein atoms of the first and second isotopes have a thermal population distribution before the coupling beam and probe beam are applied.

28. A method for producing electromagnetically induced transparency in a material comprising at least two different isotopes of the same element, the method comprising the steps of:
    a) selecting a first isotope with nonzero nuclear spin, the first isotope having electronic levels $|1\rangle$, $|2\rangle$, and $|3\rangle$ wherein:
        I) level $|1\rangle$ has the lowest energy of levels $|1\rangle$, $|2\rangle$ and $|3\rangle$;
        II) a transition between level $|2\rangle$ and level $|1\rangle$ is dipole forbidden;
        III) a transition between level $|1\rangle$ and level $|3\rangle$ is dipole allowed;
        IV) a transition between level $|2\rangle$ and level $|3\rangle$ is dipole allowed;
        VI) at least one of levels $|1\rangle$, $|2\rangle$, and $|3\rangle$ is hyperfine split; and
        VII) levels $|1\rangle$, $|2\rangle$, and $|3\rangle$ each have a center of gravity, hereinafter referred to as COG $|1\rangle$, COG$|2\rangle$, and COG $|3\rangle$, respectively;
    b) selecting a second isotope with nonzero nuclear spin, the second isotope having electronic levels $|4\rangle$, $|5\rangle$, and $|6\rangle$, wherein:
        I) level $|4\rangle$ has the lowest energy of levels $|4\rangle$, $|5\rangle$ and $|6\rangle$;
        II) a transition between level $|5\rangle$ and level $|4\rangle$ is dipole forbidden;
        III) a transition between level $|4\rangle$ and level $|6\rangle$ is dipole allowed;
        IV) a transition between level $|5\rangle$ and level $|6\rangle$ is dipole allowed;
        V) at least one of levels $|4\rangle$, $|5\rangle$, and $|6\rangle$ is hyperfine split,
        VI) levels $|4\rangle$, $|5\rangle$, and $|6\rangle$ each have a center of gravity, hereinafter referred to as COG $|4\rangle$, COG$|5\rangle$, and COG $|6\rangle$, respectively;;
        VII) the COG $|4\rangle$ is substantially coincident with the COG $|1\rangle$, the COG $|5\rangle$ is substantially coincident with the COG $|2\rangle$, and the COG $|6\rangle$ is substantially coincident with the COG $|3\rangle$;
    c) applying to the material a coupling beam tuned to be resonant with a first transition and resonant with a second transition, wherein the first transition extends between the COG $|2\rangle$ and the COG $|3\rangle$, and wherein the second transition extends between the COG $|5\rangle$ and the COG $|6\rangle$;
    d) applying to the material a probe beam tuned to be resonant with a third transition and resonant with a fourth transition, wherein the third transition extends between the COG $|1\rangle$ and the COG $|3\rangle$, and wherein the fourth transition extends between the COG $|4\rangle$ and the COG $|6\rangle$.

29. The method of claim 28 wherein COG $|3\rangle$ has a higher energy than COG $|2\rangle$ and COG $|6\rangle$ has a higher energy than COG $|5\rangle$, the method further comprising the step of detuning the coupling beam and the probe beam such that a frequency difference between the coupling beam and the probe beam corresponds to an energy difference between COG $|1\rangle$ and COG $|2\rangle$ and corresponds to an energy 8 difference between COG $|5\rangle$ and COG $|6\rangle$.

30. The method of claim 28 wherein COG $|2\rangle$ has a higher energy than COG $|3\rangle$ and COG $|5\rangle$ has a higher energy than COG $|6\rangle$, the method further comprising the step of detuning the coupling beam and probe beam such that a frequency sum of the coupling beam and the probe beam corresponds to an energy difference between COG $|1\rangle$ and COG $|2\rangle$ and corresponds to an energy difference between COG $|5\rangle$ and COG $|6\rangle$.

31. The method of claim 28 wherein:
    a) COG $|3\rangle$ has a higher energy than COG $|2\rangle$; and
    b) the first isotope has a level $|k\rangle$;
    the method further comprising the step of applying to the material an input beam tuned to a transition between COG $|2\rangle$ and level $|k\rangle$, whereby a generated beam is produced, a frequency difference between the generated beam and the input beam being equal to a frequency difference between the coupling beam and the probe beam.

32. The method of claim 28 wherein:
    a) COG $|6\rangle$ has a higher energy than COG $|5\rangle$, and
    b) the second isotope has a level $|k\rangle$,
    the method further comprising the step of applying to the material an input beam tuned to a transition between the COG $|5\rangle$ and level $|k\rangle$, whereby a generated beam is produced, a frequency difference between the generated beam and the input beam being equal to a frequency difference between the coupling beam and the probe beam.

33. The method of claim 28 wherein:
    a) COG $|2\rangle$ has a higher energy than COG $|3\rangle$, and
    b) the first isotope has a level $|k\rangle$,
    the method further comprising the step of applying to the material an input beam tuned to a transition between COG $|2\rangle$ and level $|k\rangle$, whereby a generated beam is produced, a frequency difference between the generated beam and the input beam being equal to a frequency sum of the coupling beam and the probe beam.

34. The method of claim 28 wherein:
    a) COG $|5\rangle$ has a higher energy than COG $|6\rangle$, and
    b) the first isotope has a level $|k\rangle$,
    the method further comprising the step of applying to the material an input beam tuned to a transition between COG $|5\rangle$ and level $|k\rangle$, whereby a generated beam is produced, a frequency difference between the generated beam and the input beam being equal to a frequency sum of the coupling beam and the probe beam.

35. The method of claim 28 wherein a Rabi frequency of the coupling beam is larger than the larger of:

a) the hyperfine splitting energy of level |2>,
b) the hyperfine splitting energy of level |3>,
c) the hyperfine splitting energy of level |5>, and
d) the hyperfine splitting energy of level |6>.

36. The method of claim 28 wherein a Rabi frequency of the coupling beam is at least 5 times as large as the larger of:
a) the hyperfine splitting energy of level |2>,
b) the hyperfine splitting energy of level |3>,
c) the hyperfine splitting energy of level |5>, and
d) the hyperfine splitting energy of level |6>.

37. The method of claim 28 wherein a Rabi frequency of the coupling beam is at least 8 times as large as the larger of:
a) the hyperfine splitting energy of level |2>,
b) the hyperfine splitting energy of level |3>,
c) the hyperfine splitting energy of level |5>, and
d) the hyperfine splitting energy of level |6>.

38. The method of claim 28 wherein the first and second isotopes are further selected such that an isotope shift between COG |2> and COG |1> is less than 1/10 of the hyperfine splitting energy of level |2> and less than 1/10 of the hyperfine splitting energy of level |5>.

39. The method of claim 28 wherein the first and second isotopes are further selected such that an isotope shift between COG |3> and COG |6> is less than 1/10 of the hyperfine splitting energy of level |3> and less than 1/10 of the hyperfine splitting energy of level |6>.

40. The method of claim 28 wherein atoms of the first and second isotopes have a thermal population distribution before the coupling beam and probe beam are applied.

41. An apparatus for providing electromagnetically induced transparency, the apparatus comprising:
a) a material having atoms with electronic levels |1>, |2>, and |3>, wherein:
  I) level |1> has the lowest energy of levels |1>, |2> and |3>;
  II) a transition between level |2> and level |1> is dipole forbidden;
  III) a transition between level |1> and level |3> is dipole allowed;
  IV) a transition between level |2> and level |3> is dipole allowed;
  V) at least one of levels |1>, |2>, and |3> is hyperfine split; and
  VI) levels |1>, |2>, and |3> each have a center of gravity, hereinafter referred to as COG |1>, COG |2>, and COG |3>;
b) a coupling laser directed toward the material, wherein the coupling laser is tuned to resonate with a first transition, wherein the first transition extends between the COG |2> and a COG |3>;
c) a probe laser directed toward the material, wherein the probe laser is tuned to resonate with a second transition, wherein the second transition extends between the COG |1> and a COG |3>.

42. The apparatus of claim 41 wherein the material comprises $^{207}$Pb.

* * * * *